(12) United States Patent  
Wang et al.

(10) Patent No.: US 9,322,551 B2  
(45) Date of Patent: Apr. 26, 2016

(54) WATERLESS HUMIDIFIER FOR RESIDENTIAL AND COMMERCIAL FURNACES

(71) Applicants: Dexin Wang, Indian Creek, IL (US); William E. Liss, Libertyville, IL (US); Richard A. Knight, Brookfield, IL (US)

(72) Inventors: Dexin Wang, Indian Creek, IL (US); William E. Liss, Libertyville, IL (US); Richard A. Knight, Brookfield, IL (US)

(73) Assignee: Gas Technology Institute, Des Plaines, IL (US)

( * ) Notice: Subject to any disclaimer, the term of this patent is extended or adjusted under 35 U.S.C. 154(b) by 231 days.

(21) Appl. No.: 14/090,941

(22) Filed: Nov. 26, 2013

(65) Prior Publication Data

US 2014/0174423 A1 Jun. 26, 2014

Related U.S. Application Data

(60) Division of application No. 13/076,514, filed on Mar. 31, 2011, now Pat. No. 8,591,628, which is a continuation-in-part of application No. 12/033,314, filed on Feb. 19, 2008, now Pat. No. 7,972,416.

(51) Int. Cl.
*B01D 53/22* (2006.01)
*F23J 15/00* (2006.01)
(Continued)

(52) U.S. Cl.
CPC ............... *F23J 15/00* (2013.01); *B01D 53/266* (2013.01); *F23J 15/06* (2013.01); *F24D 5/04* (2013.01); *F24F 6/02* (2013.01); *B01D 53/268* (2013.01); *F23L 2900/00001* (2013.01); *F24F 2003/1435* (2013.01); *Y02E 20/363* (2013.01)

(58) Field of Classification Search
CPC .............. F24D 5/04; F23J 15/00; F23J 15/06; F24F 6/02; F24F 2003/1435; B01D 53/266; B01D 53/268; F23L 2900/00001; Y02E 20/363

See application file for complete search history.

(56) References Cited

U.S. PATENT DOCUMENTS 1,674,337 A * 6/1928 Klees .................. F24D 5/00  
126/113  
2,022,394 A * 11/1935 Weyl .................. F24D 5/00  
126/113

(Continued)

OTHER PUBLICATIONS

Findley, M.E., "Vaporization Through Porous Membranes", I & EC Process Design and Development, Apr. 1967, v. 6:2, pp. 226-230.

(Continued)

*Primary Examiner* — Jason M Greene  
*Assistant Examiner* — Anthony Shumate  
(74) *Attorney, Agent, or Firm* — Pauley Erickson & Kottis

(57) ABSTRACT

A method and apparatus for humidifying residential and commercial buildings in which a flue gas generated by a residential or commercial furnace is provided to one side of a porous liquid water transport membrane and habitable space air is provided to an opposite side of the porous liquid water transport membrane in an amount sufficient to provide a habitable space air to flue gas volume flow rate ratio of at least 8.3:1. At least a portion of the water vapor in the flue gas is condensed, providing condensed liquid water which is passed through the porous liquid water transport membrane to the habitable space air side of the porous liquid water transport membrane. On the habitable space air side of the membrane, the condensed liquid water is evaporated into the habitable space air, producing humidified habitable space air which is provided to the rooms of the residential and commercial buildings. Beneficially, no supplemental water source is required for the humidification process.

17 Claims, 4 Drawing Sheets

(51) Int. Cl.
 *F23J 15/06* (2006.01)
 *F24D 5/04* (2006.01)
 *F24F 6/02* (2006.01)
 *B01D 53/26* (2006.01)
 *F24F 3/14* (2006.01)

(56) References Cited

U.S. PATENT DOCUMENTS

| | | | |
|---|---|---|---|
| 2,458,947 A * | 1/1949 | King | C21B 9/16 236/12.12 |
| 2,517,499 A | 8/1950 | McGrath | |
| 3,635,210 A * | 1/1972 | Morrow | F24F 6/12 126/113 |
| 3,735,559 A | 5/1973 | Salemme | |
| 3,980,605 A | 9/1976 | Steigelmann et al. | |
| 4,173,450 A * | 11/1979 | Schrank | F23C 7/00 123/25 R |
| 4,583,996 A | 4/1986 | Sakata et al. | |
| 4,875,908 A | 10/1989 | Kikukawa et al. | |
| 4,921,642 A * | 5/1990 | LaTorraca | A61M 16/1075 128/203.27 |
| 5,092,135 A * | 3/1992 | Cameron | B01D 53/261 62/271 |
| 5,236,474 A | 8/1993 | Schofield et al. | |
| 5,622,605 A | 4/1997 | Simpson et al. | |
| 5,660,048 A | 8/1997 | Belding et al. | |
| 5,690,372 A | 11/1997 | Jans | |
| 5,738,023 A | 4/1998 | Mennink | |
| 5,753,009 A | 5/1998 | Sirkar et al. | |
| 5,873,357 A * | 2/1999 | Lake | F24F 6/02 126/113 |
| 6,168,139 B1 * | 1/2001 | Kennedy | F24F 6/043 261/107 |
| 6,413,298 B1 | 7/2002 | Wnek et al. | |
| 6,490,862 B1 | 12/2002 | Beerlage et al. | |
| 6,517,607 B2 | 2/2003 | Rabovitser et al. | |
| 6,708,517 B1 | 3/2004 | Piao et al. | |
| 7,972,416 B2 * | 7/2011 | Wang | B01D 53/266 55/DIG. 17 |
| 8,591,628 B2 * | 11/2013 | Wang | F23J 15/06 126/116 R |
| 2006/0060183 A1 | 3/2006 | Hess | |
| 2006/0147773 A1 | 7/2006 | Steinshnider et al. | |
| 2007/0266962 A1 | 11/2007 | Stone et al. | |
| 2008/0054503 A1 * | 3/2008 | Patrick | F24F 6/043 261/106 |
| 2008/0079177 A1 * | 4/2008 | Schuld | F24F 6/043 261/24 |
| 2009/0205490 A1 | 8/2009 | Wang et al. | |
| 2010/0047634 A1 | 2/2010 | Nguyen et al. | |
| 2010/0065442 A9 | 3/2010 | Saffell et al. | |
| 2010/0203400 A1 | 8/2010 | Calis et al. | |
| 2011/0067610 A1 | 3/2011 | Latimer et al. | |
| 2011/0169177 A1 * | 7/2011 | Wang | F23J 15/06 261/128 |
| 2011/0226039 A1 | 9/2011 | Roland et al. | |
| 2011/0247603 A1 | 10/2011 | Dempsey et al. | |
| 2012/0318142 A1 | 12/2012 | Weber et al. | |

OTHER PUBLICATIONS

Niu, Jianlei et al., "Potential Energy Savings for Conditioning Fresh Air with a Membrane-Based Energy Recovery Ventilator", ASHRAE Transactions: Research, Jul. 13, 2010, pp. 54-63.

Kadylak, D.E., "Effectiveness Method for Heat and Mass Transfer in Membrane Humidifiers", Univ. of British Columbia, Apr. 2009, pp. i-iii.

Nasif, M.S. et al, "Heat and Mass Trasfer in Air to Air Enthalpy Heat Exchangers", 6th World Conf. on Experimental Heat Transfer, Fluid Mechanics, and Thermodynamics, Apr. 17-25, 2005, Matsushima. Miyagi, Japan, 7 pages.

Sirkar, K.K. et al., "Novel Membrane and Device for Direct Contact Membrane Distillation-Based Desalination Process", U.S. Dept. of the Interior, Bureau of Reclamation, Technical Service Center, Water Treatment Engineering and Research Group, Mar. 2001, 64 pages.

\* cited by examiner

WATERLESS HUMIDIFIER FOR RESIDENTIAL AND COMMERCIAL FURNACES

CROSS-REFERENCE TO RELATED APPLICATIONS

This application is a divisional application of U.S. patent application Ser. No. 13/076,514, filed 31 Mar. 2011, now U.S. Pat. No. 8,591,628, issued on 26 Nov. 2013, which is continuation-in-part application of U.S. patent application Ser. No. 12/033,314, filed 19 Feb. 2008, now U.S. Pat. No. 7,972,416, issued on 5 Jul. 2011. These applications are herein incorporated by reference herein in their entirety and are made a part hereof, including but not limited to those portions which specifically appear hereinafter.

BACKGROUND OF THE INVENTION

1. Field of the Invention

This invention relates to a method and apparatus for humidifying air in habitable spaces using the water vapor from moisture-laden flue gas produced by residential or commercial furnaces. In one aspect, this invention relates to a "waterless humidification" method and apparatus for residential and commercial buildings. By "waterless humidification," we mean humidification without the addition of supplemental water, i.e., without any water other than the water obtainable from moisture-laden flue gas. In one aspect, this invention relates to a method and apparatus for humidifying air using a liquid water transport membrane in which water vapor from the moisture-laden flue gas is condensed and the condensed (liquid) water is transported through the membrane for evaporation into an air stream.

2. Description of Related Art

Methods and apparatuses for the selective removal of one or more components from a gaseous mixture are well-known. U.S. Pat. No. 5,753,009 teaches a method and apparatus for selective removal of one or more components from a multi-component gas/vapor mixture by membrane fractionation. The membrane fractionation gas removal system comprises a feed chamber containing gas/vapor mixture, at least one porous membrane having a first side which contacts the gas/vapor mixture in the feed chamber, at least one non-porous membrane having one side which contacts the second side of the porous membrane, which non-porous membrane has a permeability selective to one or more components of the gas/vapor mixture, an exit chamber connected to the second side of the non-porous membrane such that the component exiting the non-porous membrane enters the exit chamber, and an evacuation member connected to the exit chamber for evacuating one or more components from within the exit chamber. U.S. Pat. No. 4,875,908 teaches a process for selectively separating water vapor from a multi-component gaseous mixture in which the multi-component gaseous mixture comprising the water vapor is passed along and in contact with a membrane which is selectively permeable to water vapor. The use of membranes for selective removal of one or more components of a gaseous mixture is also taught by U.S. Pat. No. 4,583,996 (inorganic porous membrane), U.S. Pat. No. 3,980,605 (fibrous semi-permeable membrane), and U.S. Pat. No. 3,735,559 (sulfonated polyxylylene oxide membranes).

Methods and apparatuses for selective removal of water vapor from a gaseous mixture and condensing the separated water vapor to recover its latent heat of vaporization are also known. U.S. Pat. No. 5,236,474 teaches a process for removing and recovering a condensable vapor from a gas stream by a membrane contactor in which a gas stream containing a condensable vapor is circulated on one side of a hollow fiber membrane while cool extraction fluid is circulated on the other side under a total pressure differential. As a result, the condensable vapor in the gas stream is condensed in the gas stream and the condensed vapor, i.e. liquid, permeates the membrane and becomes entrained in the cool extraction fluid. U.S. Pat. No. 6,517,607 B2 teaches a method for removing a condensable component from a process stream in which a first side of a permselective membrane is contacted with a process stream in which is disposed the condensable component. The condensable component is passed through the permselective membrane to a second side of the permselective membrane, forming a condensable permeate. The condensable permeate is then contacted with a liquid stream having a liquid form of the condensable permeate, forming a condensed permeate, which may then be returned to the process which generated the process stream.

In colder climates, air within buildings tends to be dry as a result of which humidification is frequently employed to add more moisture to the air to keep people within the building comfortable and to prevent damage to dry-sensitive objects within the building. Conventional means for humidifying air include adding water by spray, atomizers, or distributors. Typically, in a house, a whole house humidifier installed with the furnace is the best way to humidify all the air in the house. A typical residential humidifier requires a water supply to distribute water along a filter such that hot and dry air coming through the filter will evaporate some of the water so that the air can be humidified. To ensure sufficient wetting of the filter and minimize deposition of dissolved minerals on the filter, a portion of the water supplied to the filter is wasted and goes down to the drain.

Typically, 12 gallons per day of water needs to be added to the air for a house with 3000 ft.sup.2, requiring about 105,000 Btu of additional energy per day to vaporize the water. Considering the wasted water to the drain, a consumption of 20 gallons per day of water is typical. However, in addition to conventional water supplies, water is also present in the residential gas furnace flue gas. For example, for a typical 110,000 BTU/hour residential gas furnace flue gas, approximately 30.75 gallons of water per day could be available for this purpose. Extraction of 40% of this water could provide about 12.3 gallons per day, which is enough to meet the typical residential air humidification demand. However, flue gas typically contains contaminants, such as carbon monoxide (CO), carbon dioxide (CO.sub.2), and nitrogen (N.sub.2), which would contaminate the building air supply, rendering the building uninhabitable.

SUMMARY OF THE INVENTION

Accordingly, it is one object of this invention to provide a method and apparatus for humidifying habitable space air which substantially eliminates the necessity of a water supply required by conventional residential and commercial humidification systems and methods.

It is another object of this invention to provide a method and apparatus for humidifying air for use in residential and commercial buildings which utilizes only the water vapor in flue gas as a water supply for adding humidity to the air supply to the buildings.

It is yet another object of this invention to reduce the amount of energy required for humidification of habitable spaces compared with conventional humidification equipment and methods, in particular, by eliminating the energy employed for the direct evaporation of water used by conventional humidification and methods.

These and other objects of this invention are addressed by a method for humidifying air in habitable spaces or rooms in residential or commercial buildings in which a flue gas comprising water vapor generated by a residential or commercial furnace through the reaction of fuel with combustion air is provided to one side of a porous liquid water transport membrane and air, referred to herein as habitable space air or room air, to be humidified, typically at a temperature in the range of about 40.degree. F. to about 100.degree. F., preferably in the range of about 60.degree. F. to about 80.degree. F., is provided to the opposite side of the porous liquid water transport membrane in an amount sufficient to provide an air to flue gas volume flow rate ratio of at least 8.3:1. At least a portion of the water vapor is condensed in the pores of the membrane, producing liquid water in a sufficient amount to prevent other flue gas components from passing through the membrane, which liquid water is transported through the membrane to the opposite side of the membrane where it is evaporated into the air to be humidified, producing humidified habitable space air which is then provided to the habitable space. By using this membrane separation technique to transfer water vapor from the flue gases to the habitable space air, harmful gaseous components in the flue gas, such as CO, $CO_2$, and $N_2$, are substantially blocked from passing through the membrane due to the presence of the liquid water in the membrane, thereby preventing contamination of the humidified habitable space air. In addition to humidifying the air, the higher temperature flue gas also gives up its heat to the lower temperature habitable space air, thereby enabling capture of the energy from the flue gas and increasing efficiency of the air heating and humidification process. Because only substantially pure water passes through the membrane, water contaminant problems associated with the operation of conventional building humidifiers over an extended period of time are avoided. In addition, use of the water vapor in the flue gas in accordance with the method and apparatus of this invention avoids the cost of installing a water supply line and the cost to regularly replace the filter employed in conventional systems due to mineral deposition build and microbial growth on the filter. The driving force for this transfer of heat and is the differential partial pressure of the condensable water vapor across the membrane.

The method of this invention may be carried out in an apparatus comprising a habitable space air conduit providing fluid communication between the apparatus and a habitable space and a humidification element, referred to herein as a transport membrane humidifier, disposed within the habitable space air conduit. The transport membrane humidifier comprises a porous liquid water transport membrane having a flue gas side and an air side opposite the flue gas side which is suitable for selectively passing substantially only condensed water vapor from the flue gas contacting the flue gas side through the porous liquid water transport membrane to the air side of the membrane.

Also provided is an apparatus for habitable space conditioning comprising a furnace having a combustion air inlet, a flue gas outlet, a habitable space air inlet for receiving air to be conditioned from a habitable space, a conditioned air outlet for providing conditioned air to said habitable space, and heat exchange means for transferring heat from a flue gas generated by said furnace to said air to be conditioned. The apparatus further includes a flue gas exhaust conduit in fluid communication with said flue gas outlet and having a flue gas exhaust gas outlet, a conditioned air conduit providing fluid communication between said conditioned air outlet and said habitable space, a return air conduit providing fluid communication between said habitable space air inlet and said habitable space, and air humidification means for humidifying said air to be conditioned to a level up to about 60% relative humidity without water from an external water supply.

In an apparatus for habitable space air conditioning comprising a furnace having a combustion air inlet, a burner, a flue gas outlet, a habitable space air inlet, a habitable space return air duct providing fluid communication between said habitable space air inlet and a habitable space, a conditioned habitable space air outlet, a conditioned habitable space air duct providing fluid communication between said conditioned habitable space air outlet and said habitable space, and at least one heat exchanger adapted to exchange heat between a flue gas generated by said burner and habitable space air to be conditioned, there is provided the improvement comprising air humidification means for humidifying said air to be conditioned to a level up to about 60% relative humidity without water from an external water supply.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The invention disclosed herein is a method and apparatus or system for environmentally conditioning spaces or rooms within buildings employing a transport membrane humidifier in which water vapor contained within a flue gas is transferred to the air in the spaces, thereby humidifying the air while blocking undesirable gaseous components in the flue gas from passing into the air, and in which the water vapor in the flue gas is the sole source for water used to humidify the air. The driving force for the water vapor to pass through the membrane is the water vapor partial pressure difference between the flue gas and the air to be humidified. That is, the water vapor partial pressure on the flue gas side of the membrane of the transport membrane humidifier is higher than the water vapor partial pressure on the air side of the membrane. The method and apparatus of this invention avoid the use of energy directly for water vaporization as required by traditional home and building humidifiers.

Figure 1:
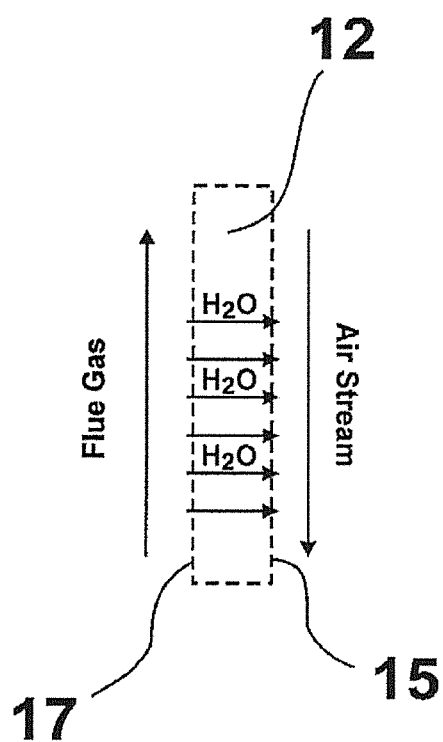
FIG. 1 is a diagram showing the basic concept of this invention.

The basic concept of this invention is shown in FIG. 1. As shown therein, flue gas containing water vapor is provided to the flue gas side 17 of a porous liquid water transport membrane 12. In accordance with one preferred embodiment, pore sizes of the membrane are one of less than or equal to about 50 nanometers (nm). Suitable materials for use as a porous liquid water transport membrane in accordance with one embodiment of this invention are mesoporous ceramics, such as an alumina ceramic. The water vapor condenses in the pores of the membrane resulting in the disposition of liquid water in the pores of the membrane in an amount sufficient to fill the pores and prevent the passage of gaseous components in the flue gas through the membrane. The liquid water is transported through the membrane to the air side 15 the membrane to which habitable space air is provided, whereby the liquid water is evaporated into the air. During the liquid water transport process, the higher temperature flue gas gives up heat to the lower temperature habitable space air as sensible and latent heat, thereby increasing energy efficiency. Because only substantially pure water is transported through the membrane, water contaminant problems that often impact the operation of humidifiers over an extended period of time are avoided. In addition, recycling water from the flue gas also avoids the costs of installing a water supply line and the costs of regularly replacing the filter employed in conventional systems due to mineral deposition buildup and microbial growth on its surface.

Figure 2:
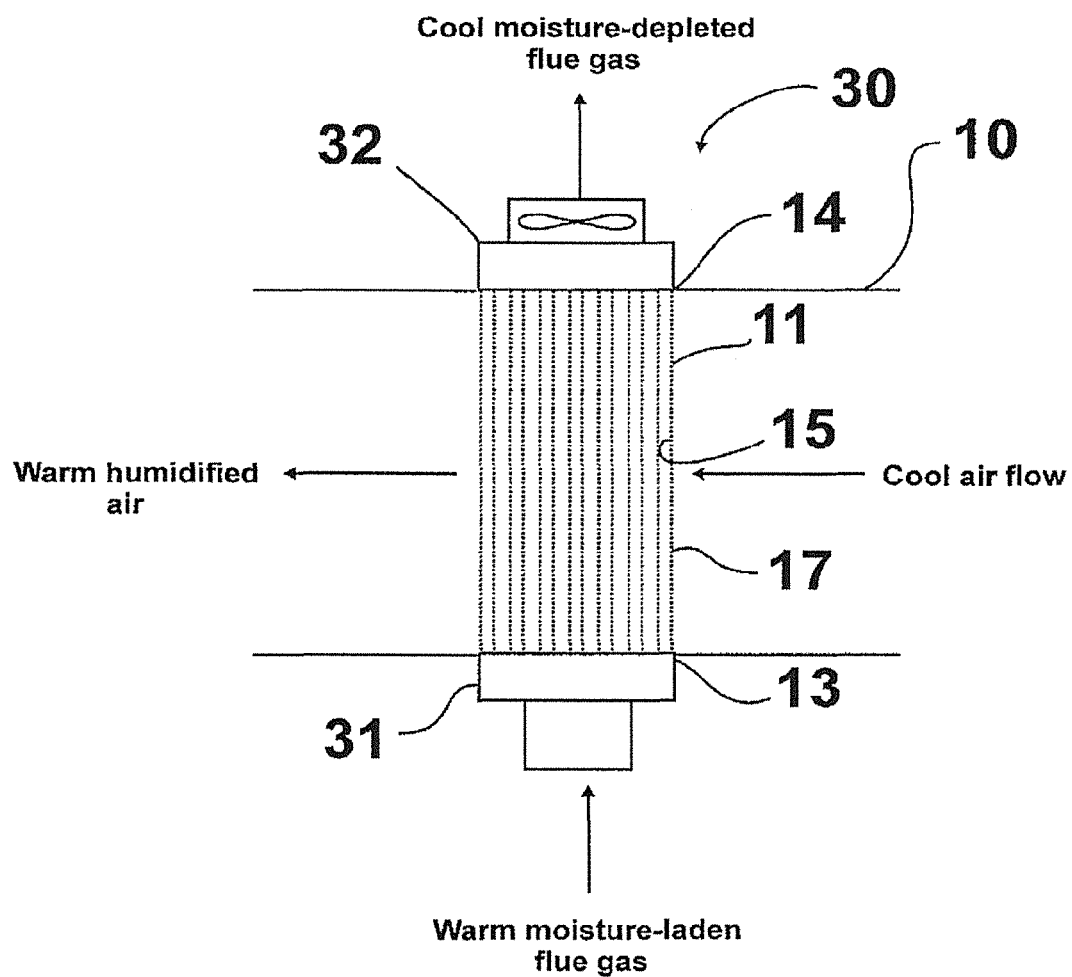
FIG. 2 is a schematic diagram of a transport membrane humidifier in accordance with one embodiment of this invention.

In accordance with one embodiment of this invention as shown in FIG. 2, the transport membrane humidifier 30, shown within a furnace air duct 10, comprises at least one tubular flue gas conduit 11 having a flue gas inlet end 13 connected with a flue gas inlet manifold 31, a flue gas outlet end 14 connected with a flue gas outlet manifold 32, wherein the at least one tubular flue gas conduit is formed by a porous liquid water transport membrane having an air side 15 corresponding to an outer surface of the conduit and a flue gas side 17 corresponding to an inner surface of the conduit. During operation, a dry habitable space air stream flows duct 10 upstream of the porous water transport membrane and a water vapor-laden flue gas is introduced through flue gas inlet manifold 31 into the flue gas inlet 13 of tubular flue gas conduit 11. As the water vapor-laden flue gas contacts the surface on flue gas side 17 of the porous liquid water transport membrane, the water vapor in the flue gas condenses within the pores of the membrane, producing liquid water. By virtue of a capillary condensation separation mechanism, the liquid water, and substantially only the liquid water, passes through the membrane to the air side of the membrane. The dry habitable space air flowing through the duct 10 contacts the air side of the membrane, resulting in evaporation of the liquid water into the habitable space air and humidification thereof. The water vapor-depleted flue gas is then exhausted through the flue gas outlet 14 of tubular flue gas conduit 11. Although shown as a tubular structure, it will be appreciated that the method of this invention may be accomplished using a planar membrane, wherein the water vapor-laden flue gas contacts one side of the membrane, resulting in condensation of the water vapor the membrane, and the air stream contacts the opposite side of the membrane in evaporation of the liquid water passed through the membrane into the air stream.

Figure 3:
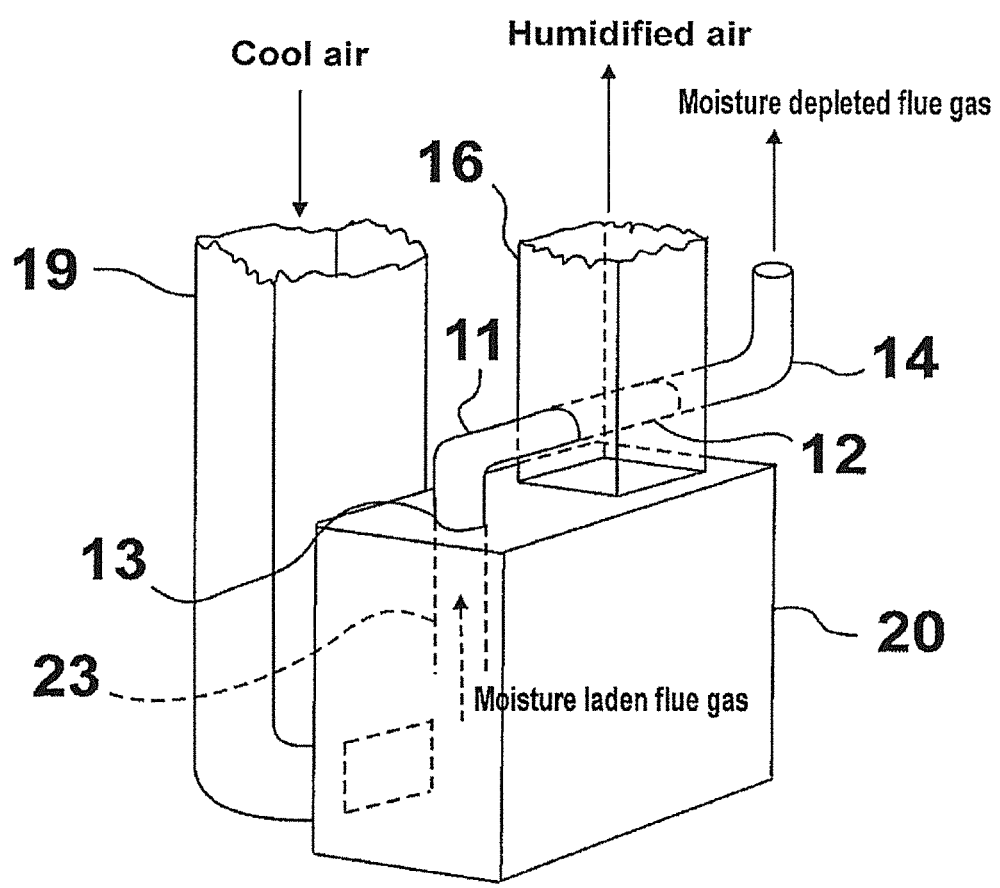
FIG. 3 is a schematic diagram of a building heating and humidification system in accordance with one embodiment of this invention employing a transport membrane humidifier disposed within a conditioned habitable space air conduit or duct.

FIG. 3 shows an apparatus in accordance with one embodiment of this invention in which a porous liquid water transport membrane 12 is disposed within a heated air duct 16, i.e. habitable space air outlet, of a fossil fuel-fired residential or commercial heating system. In this embodiment, cool habitable space air typically from a space within a building containing the heating system is introduced through a cool habitable space air duct 19 into a furnace 20 in which the cool air is heated, producing heated, dry habitable space air. The heated, dry air is transported from the furnace 20 through air duct 16, through which humidified habitable space air is returned to the building space and in which is disposed the porous liquid water transport membrane 12. Flue gas generated by the combustion process in the furnace is exhausted through a flue gas conduit 23 having a flue gas inlet in fluid communication with the furnace combustor and having a flue gas outlet in fluid communication with the flue gas inlet 13 of tubular flue gas conduit 11. In accordance with this embodiment, all of the water vapor-laden flue gas flows through the tubular porous liquid water transport membrane 12 and all of the heated, dry air contacts the outer surface of the membrane, capturing condensed water vapor (liquid water) and heat from the flue gas. This mode of operation provides a potential maximum benefit of air humidification because all of the heated, dry air flows over the porous liquid water transport membrane. However, because the air duct is typically large in size, the porous liquid water transport membrane must be large in size or consist of multiple, smaller tubular elements to match the size of the duct.

Figure 4:
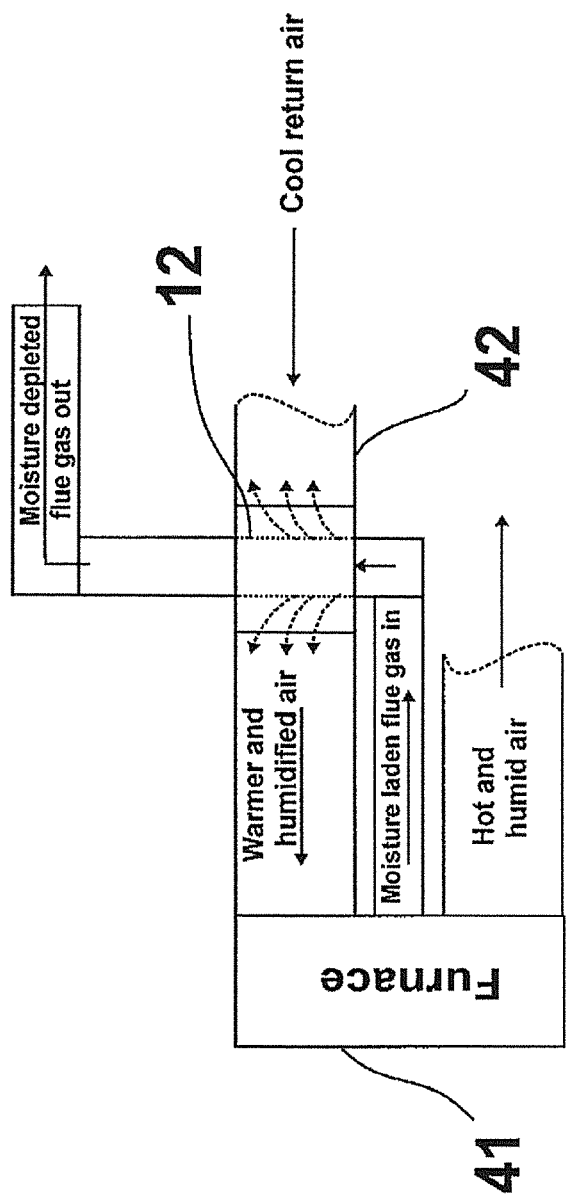
FIG. 4 is a schematic diagram of a building heating system in accordance with one embodiment of this invention in which the permselective liquid water transport membrane is disposed within the return air duct or conduit through which air to be heated and humidified is provided to the furnace.

FIG. 4 shows one operating mode of a building heating system in accordance with one embodiment of this invention in which the porous liquid water transport membrane 12 is disposed in the furnace return air duct or conduit 42 by which habitable space air to be heated is provided to the furnace 41. In accordance with this embodiment, all of the cool habitable space return air is humidified and heated by the flue gas flowing on the flue gas side of the membrane, thereby providing the potential for the maximum benefit of air humidification.

As previously indicated, for a typical house with 3000 ft.sup.2, about 12 gallons per day of water are required to humidify the air in the house. In addition, a significant amount of water is discarded from conventional humidification systems in the form of waste water, resulting in a total water consumption for humidification of about 20 gallons per day.

In order to ensure sufficient water vapor condensation in the porous liquid water transport membrane to preclude the passage of any undesirable gaseous components in the flue gas through the membrane into the humidified habitable space air, we have discovered that a habitable space air to flue gas volume flow rate ratio of at least 8.3:1 is required. Operation at a lower ratio will not provide the required water vapor condensation within the membrane. 8.3:1 is the ratio at which water vapor in the flue gas begins to condense in the membrane. However, it will be appreciated that at such a low ratio the evaporation rate on the air side of the membrane would be relatively low and, as such, insufficient for providing the desired level of humidification. Accordingly, for most applications, a higher air to flue gas volume flow rate ratio will be required. In accordance with one embodiment of this invention, the habitable space air to flue gas volume flow rate ratio is in the range of about 20:1 to about 200:1. In accordance with one preferred embodiment, the habitable space air to flue gas volume flow rate ratio is in the range of about 40:1 to about 100:1. In accordance with one particularly preferred embodiment, the habitable space air to flue gas volume flow rate ratio is in the range of about 40:1 to about 70:1.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An apparatus for habitable space conditioning comprising:
    a furnace having a combustion air inlet, a flue gas outlet, a habitable space air inlet for receiving air to be conditioned from a habitable space, a conditioned air outlet for providing conditioned air to said habitable space, and heat exchange means for transferring heat from a flue gas generated by said furnace to said air to be conditioned;
    a flue gas exhaust conduit in fluid communication with said furnace flue gas outlet, said flue gas exhaust conduit having a flue gas exhaust gas outlet;
    a conditioned air conduit providing fluid communication between said furnace conditioned air outlet and said habitable space;
    a return air conduit providing fluid communication between said habitable space and said furnace habitable space air inlet; and
    air humidification system for humidifying said air to a level up to about 60% relative humidity without water from an external water supply.

2. The apparatus of claim 1, wherein said air humidification system comprises a transport membrane humidifier having at least one porous liquid water transport membrane having a flue gas contact side and an opposite air contact side, said flue gas contact side in fluid communication with said flue gas outlet and said air contact side in fluid communication with said habitable space.

3. The apparatus of claim 2, wherein said at least one liquid water transport membrane is disposed in one of said conditioned air conduit and said return air conduit.

4. The apparatus of claim 2, wherein said at least one porous liquid water transport membrane has a shape of a tube.

5. The apparatus of claim 4, wherein an interior of said tube corresponds to said flue gas contact side.

6. The apparatus of claim 4, wherein an interior of said tube corresponds to said air contact side.

7. The apparatus of claim 2, wherein said transport membrane humidifier is adapted to accommodate an air to flue gas volume flow rate ratio of at least about 8.3:1 at substantially atmospheric pressures of said flue gas and said air to be conditioned.

8. The apparatus of claim 2, wherein said porous liquid water transport membrane has pore sizes less than about 50 µm or equal to about 50 µm.

9. In an apparatus for habitable space air conditioning comprising a furnace having a combustion air inlet, a burner, a flue gas outlet, a habitable space air inlet, a habitable space return air duct providing fluid communication between said habitable space air inlet and a habitable space, a conditioned habitable space air outlet, a conditioned habitable space air duct providing fluid communication between said conditioned habitable space air outlet and said habitable space, and at least one heat exchanger adapted to exchange heat between a flue gas generated by said burner and habitable space air to be conditioned, the improvement comprising:
    air humidification system for humidifying said air to a level up to about 60% relative humidity without water from an external water supply.

10. The apparatus of claim 9, wherein said air humidification system comprises a liquid water transport module having a porous liquid water transport membrane having a flue gas side and a habitable air space side opposite said flue gas side.

11. The apparatus of claim 10, wherein said air humidification system is disposed in one of said habitable space return air duct and said conditioned habitable space air duct.

12. The apparatus of claim 10, wherein said at least one porous liquid water transport membrane is in a shape of a tube.

13. The apparatus of claim 12, wherein an interior of said tube corresponds to said air side.

14. The apparatus of claim 12, wherein an interior of said tube corresponds to said air side.

15. The apparatus of claim 10, wherein said liquid water transport module is adapted to accommodate an air to flue gas volume flow rate ratio of at least about 8.3:1 at substantially atmospheric pressures of said flue gas and said air to be conditioned.

16. An apparatus for conditioning habitable space air, the apparatus comprising:
    a furnace having a combustion air inlet, a flue gas outlet, a habitable space air inlet for receiving air to be conditioned from a habitable space, and a conditioned air outlet for providing conditioned air to said habitable space, the furnace generating a flue gas comprising water vapor;
    a flue gas exhaust conduit in fluid communication with said flue gas outlet and having a flue gas exhaust gas outlet;
    a conditioned air conduit providing fluid communication between said conditioned air outlet and said habitable space;
    a return air conduit providing fluid communication between said habitable space and said habitable space air inlet; and
    a liquid water transport module disposed in one of said return air duct and said conditioned air duct, said liquid transport module comprising a porous liquid water transport membrane having a flue gas side and a habitable air space side opposite said flue gas side,
    said apparatus to produce air humidified to a level up to about 60% relative humidity without water from an external water supply.

17. The apparatus of claim 16, wherein said liquid water transport module is disposed in said return air duct and said liquid water transport module also transfers heat to the return habitable space air.

* * * * *